INVENTORS
D.M. VESPER
C.E. JONES

BY Young + Quigg

ATTORNEYS

United States Patent Office 3,625,054
Patented Dec. 7, 1971

3,625,054
ENGINE ANALYZER TO MEASURE MEAN EFFECTIVE PRESSURE OF A FOUR CYCLE INTERNAL COMBUSTION ENGINE
Daniel M. Vesper and Charles E. Jones, Bartlesville, Okla., assignors to Phillips Petroleum Company
Filed Nov. 20, 1969, Ser. No. 878,382
Int. Cl. G01m 15/00
U.S. Cl. 73—115               5 Claims

ABSTRACT OF THE DISCLOSURE

The indicated mean effective pressure in the cylinder of an internal combustion engine is measured from the output of a pressure transducer. This is accomplished by establishing a signal representative of the difference between the integrals of the cylinder pressure during compression and expansion. The measuring apparatus includes an integrator and switching means to transmit pressure signals in response to operation of the engine.

It is common practice to employ test engines to evaluate fuels, additives, and lubricants for internal combustion engines. In order to monitor the operation of a test engine, transducers are connected to one or more of the cylinders to measure pressure variations. One parameter that is frequently calculated is the "indicated mean effective pressure," which is defined as the difference between the integrals of the cylinder pressure during compression and expansion. It is usually desirable to optimize this value for each change in operating conditions of the engine. Heretofore, the indicated mean effective pressure has been calculated manually from readings of the pressure transducer output on an oscilloscope. This procedure generally requires approximately two hours to make a calculation at a given set of operating conditions.

In accordance with the present invention, apparatus is provided for computing the indicated mean effective pressure in an internal combustion engine automatically. The output signal from a pressure transducer, which is connected in a cylinder of the test engine, is applied to a signal integrator. Apparatus is provided for subsequently reversing the polarity of the signal applied to the integrator so that the integral of the measured pressure during the compression cycle can be subtracted from the integral or the measured pressure during the expansion cycle. The output signal from the integrator is applied through a storage circuit to a suitable indicator or recorder to provide a direct measurement of the indicated mean effective pressure. The apparatus includes means for controlling the operation of the measuring circuit automatically in response to the engine strokes.

Figure 1:
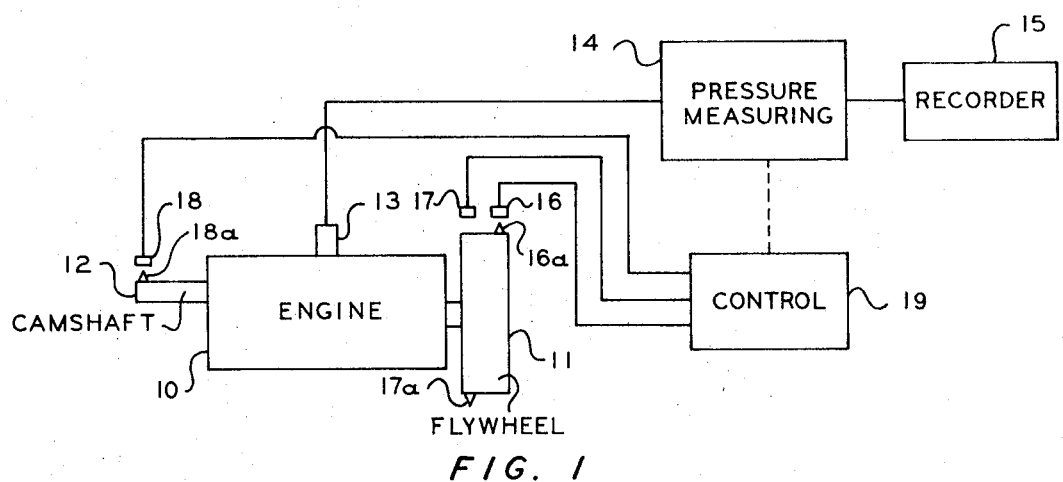
Figure 3A:
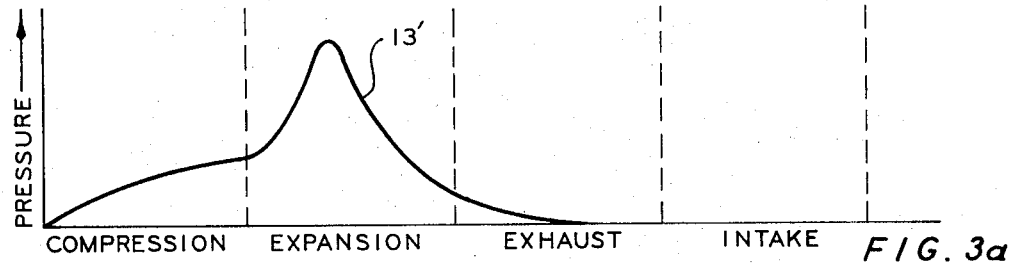
Figure 3B:
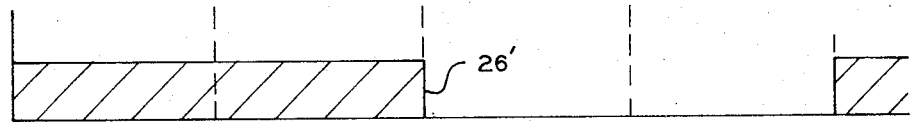
Figure 3C:
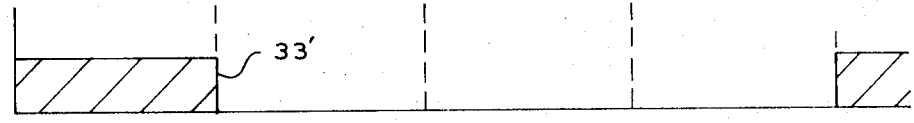
Figure 2:
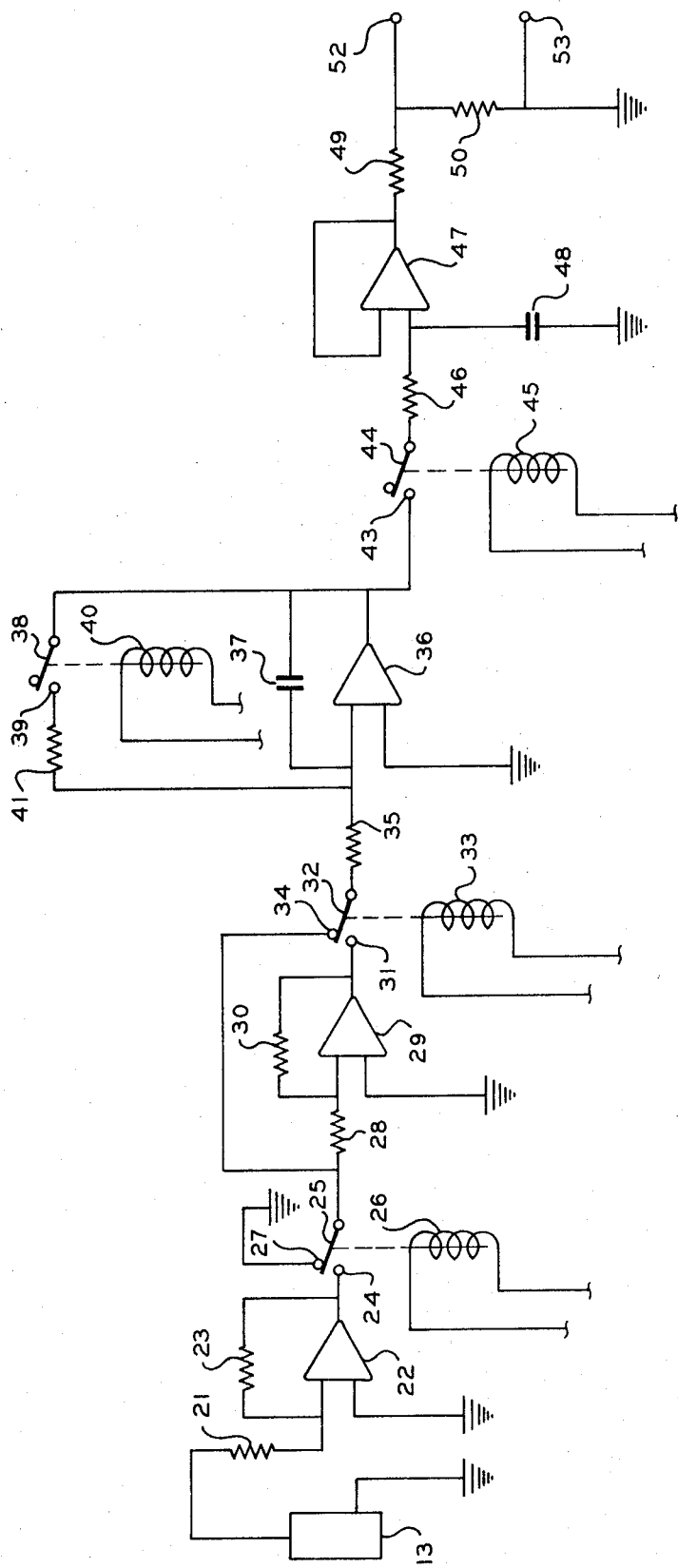

In the accompanying drawing, FIG. 1 is a schematic representation of the measuring apparatus of this invention connected to an internal combustion engine. FIG. 2 is a schematic circuit drawing of the pressure measuring apparatus of FIG. 1. FIG. 3a illustrates pressure variations within a cylinder of a typical internal combustion engine. FIGS. 3b, 3c, 3d and 3e illustrate the sequence of operation of the switching relays in the circuit of FIG. 2. FIG. 4 is a schematic circuit drawing of the control apparatus employed in the measuring apparatus of FIG. 1.

Referring now to the drawing in detail and to FIG. 1 in particular, there is shown a conventional internal combustion engine 10 which includes a flywheel 11 and a cam shaft 12. A pressure transducer 13 is connected to the engine so as to provide an output signal representative of the pressure within a cylinder of the engine. This output signal is applied to a pressure measuring circuit 14. The output signal from circuit 14 is applied to a recorder 15. Two switches 16 and 17 are mounted adjacent flywheel 11 so as to be actuated by respective spikes 16a and 17a on the flywheel. These switches can be of the type illustrated in FIG. 4 of U.S. Patent 2,941,396, for example. A similar switch 18 is mounted adjacent cam shaft 12 so as to be actuated by a spike 18a. As an alternative, particularly when the engine is operating at slow speeds, one or more of these switches can be replaced by mechanical switches which are actuated by cams on the rotating elements. Switches 16, 17 and 18 are connected to a control circuit 19 which regulates the operation of pressure measuring circuit 14.

Pressure measuring circuit 14 is illustrated schematically in FIG. 2. Pressure transducer 13 is of a type which provides an output electrical signal, the amplitude of which is representative of the magnitude of the pressure within the cylinder of the engine. Various types of pressure transducers which provide such a signal are well known in the art, such as, for example, a strain gauge connected in a bridge circuit. The output signal from transducer 13 is applied through a resistor 21 to the input of an amplifier 22, the latter having a feedback resistor 23. The output of amplifier 22 is connected to a terminal 24 which is adapted to be engaged by a switch 25 when a relay coil 26 is energized. In the absence of coil 26 being energized, switch 25 is connected to a grounded terminal 27. Amplifier 22 is employed to increase the amplitude of the signal from transducer 23 to a suitable level for subsequent processing.

Switch 25 is connected through a resistor 28 to the input of an operational amplifier 29, the latter being provided with a feedback resistor 30. The output of amplifier 29 is connected to a terminal 31 which is engaged by a switch 32 when a relay coil 33 is energized. Switch 32 engages a terminal 34 when relay coil 33 is not energized. Terminal 34 is connected directly to switch 25. Amplifier 29 provides a polarity reversal.

Switch 32 is connected through a resistor 35 to the input of an operational amplifier 36 which operates as an integrator. To this end, the amplifier is provided with a feedback capacitor 37. A resistor 41 is connected in parallel with capacitor 37 when a switch 38 engages a terminal 39. This occurs when a relay coil 40 is energized. Closure of switch 38 thus serves to reset the integrator to zero. The output of amplifier 36 is connected to a terminal 43 which is engaged by a switch 44 when a relay coil 45 is energized. Switch 44 is connected through a resistor 46 to the input of an amplifier 47. A storage capacitor 48 is connected between this input and ground. Resistors 49 and 50 are connected in series between the output of amplifier 47 and ground. Terminals 52 and 53 are connected to the respective ends of resistor 50. These terminals are connected to the input terminals of recorder 15 of FIG. 1.

FIG. 3a illustrates typical pressure variations within a cylinder of an internal combustion engine during the compression, expansion, exhaust and intake strokes. It can be seen that the pressure builds up during the compression stroke at a fairly uniform rate. The pressure builds up to a peak during the expansion stroke and then falls off quite rapidly, with this decrease in pressure continuing into the exhaust stroke. Measuring circuit 14 provides an output signal which represents the difference between the integrals of the pressure during the compression and expansion cycles.

FIGS. 3b, 3c, 3d and 3e illustrate the times that respective relay coils 26, 33, 40 and 45 of FIG. 2 are energized. These relay coils are energized by the control circuit of FIG. 4 which is described in detail hereinafter.

Figure 3D:
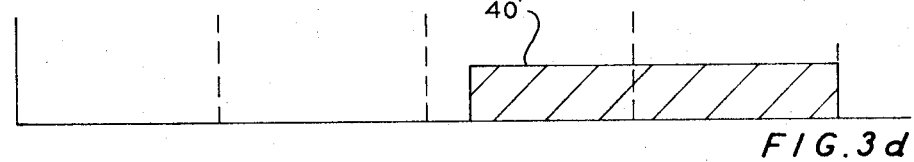
Figure 3E:
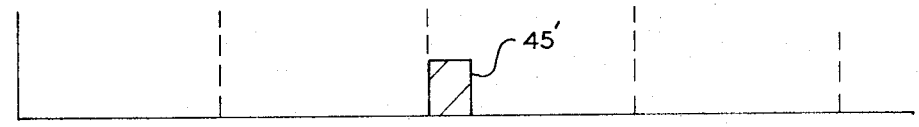
Figure 4:
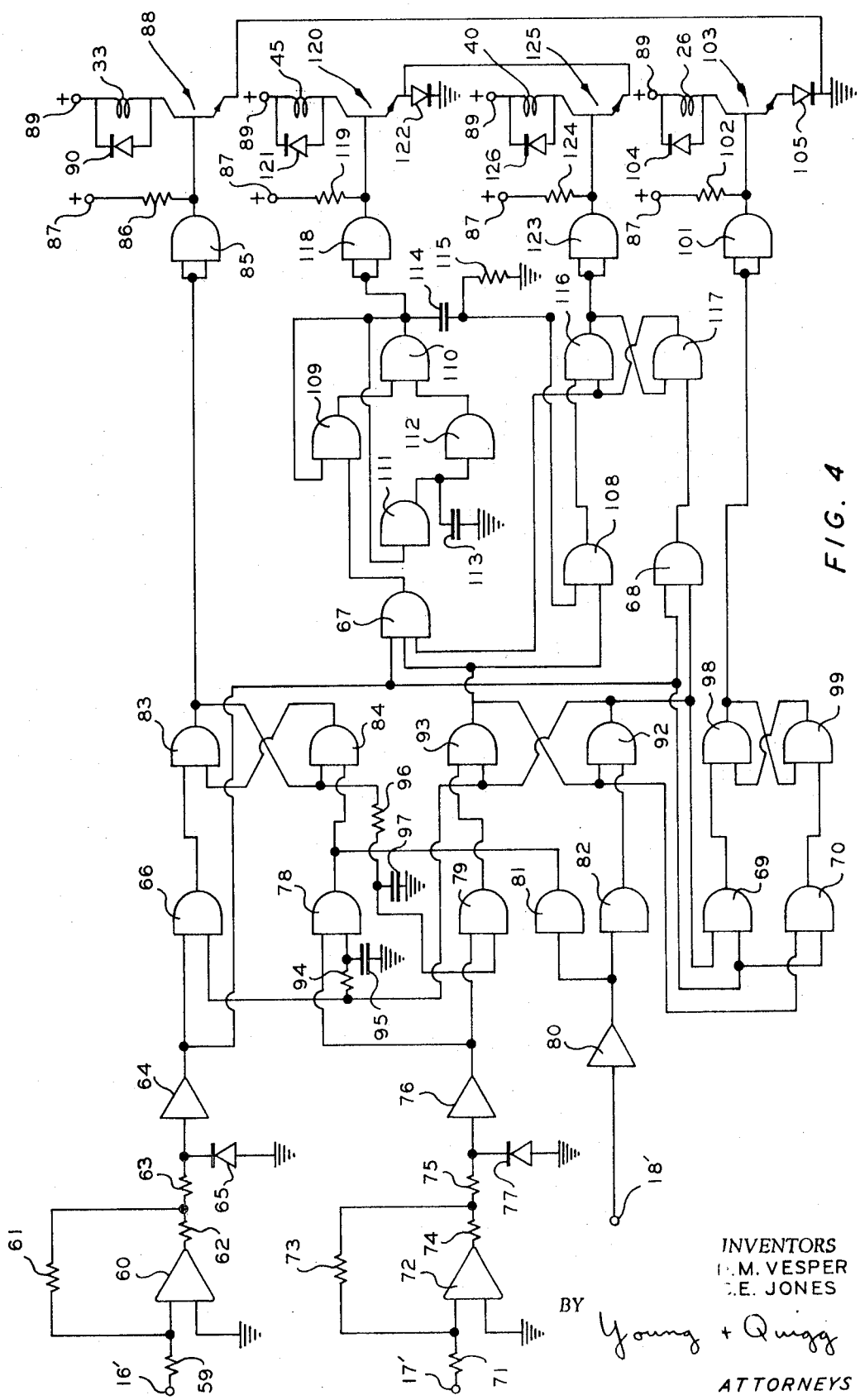

Immediately prior to the beginning of the compression stroke, relay coil 40 is energized, as illustrated by shaded area 40' of FIG. 3d. This serves to reset integrator 36 in preparation for the measuring cycle. At the beginning of the compression stroke, relay coil 40 is deenergized so that switch 38 is opened. Relay coils 26 and 33 are energized at the beginning of the compression stroke, as illustrated by respective shaded areas 26' and 33' of FIGS. 3b and 3c, so that switches 25 and 32 are closed. The output signal from transducer 13 is thus applied through polarity reversing amplifier 29 to the input of integrator 36. The integrator thus stores a signal which is representative of the integral of the pressure buildup during the compression stroke. At the beginning of the expansion stroke, relay coil 33 is deenergized so that polarity reversing amplifier 29 is removed from the circuit. Thus, the output signal from pressure transducer 13 is applied directly to integrator 36 during the expansion stroke. The phase reversal results in a "subtraction" taking place. A signal representative of the difference between these two integrated signals is thus stored on capacitor 37 at the end of the expansion stroke. At this time, relay coil 45 is closed momentarily to transfer the stored signal to capacitor 48. Thereafter, relay coil 45 is deenergized to prepare the circuit for the next compression cycle. The opening of switch 44 thus leaves a signal on storage capacitor 48 which is representative of the difference between the two measured integrals. This stored signal is applied through amplifier 47 to recorder 15 during the remainder of the exhaust and intake strokes and during the next compression and expansion strokes. Since the difference between the two integrals is normally negative when computed in the manner described, amplifier 47 can provide a phase reversal to establish a positive output signal. At the end of the next expansion stroke, relay coil 45 is once again closed to apply the output signal from integrator 36 to storage capacitor 48. In this manner, the signal applied to storage capacitor 48 is updated at the completion of each expansion cycle.

The apparatus illustrated in FIG. 4 is employed to control relay coils 26, 33, 40 and 45 in the sequence described. Spikes 16a and 17a on flywheel 11 are mounted 180° apart. Spike 16a is positioned to actuate switch 16 at the beginning of the compression stroke and at the beginning of the exhaust stroke. Spike 17a actuates switch 17 at the beginning of the expansion and intake strokes. Spike 18a on cam shaft 12 actuates switch 18 at the beginning of each compression stroke. Switches 16, 17 and 18 actually constitute signal generators in that they establish electrical pulses when the respective spikes pass the switches. The signals from switches 16, 17 and 18 are applied to respective input terminals 16', 17' and 18' of FIG. 4. Terminal 16' is connected to the input of an amplifier 60 which is provided with a feedback resistor 61. The output of amplifier 60 is applied through resistors 62 and 63 to the input of an amplifier 64. A rectifier 65 is connected between ground and the input of amplifier 64. The output of amplifier 64 is applied to first inputs of AND circuits 66, 67, 68, 69 and 70. In similar fashion, terminal 17 is connected by a resistor 71 to the input of an amplifier 72 which is provided with a feedback resistor 73. The output of amplifier 72 is connected through resistors 74 and 75 to the input of an amplifier 76. A rectifier 77 is connected between ground and the input of amplifier 76. The output of amplifier 76 is applied to inputs of AND circuits 78 and 79. Terminal 18' is connected to the input of an amplifier 80. The output of amplifier 80 is applied to inputs of AND circuits 81 and 82.

The output of AND circuit 66 is applied to an input of AND circuit 83. The output of circuit 83 is applied to inputs of AND circuits 84 and 85. The output of AND circuit 85 is connected through a resistor 86 to a terminal 87 which is maintained at a positive potential. The output of AND circuit 85 is also connected to the base of a transistor 88. The collector of transistor 88 is connected through relay coil 33 to a terminal 89 which is maintained at a positive potential. A rectifier 90 is connected in parallel with relay coil 33. The emitter of transistor 88 is connected to ground.

The outputs of AND circuits 78 and 81 are connected to one another and the second input of circuit 84. The output of circuit 84 is connected to the second input of circuit 83. The output of circuit 82 is connected to the first input of an AND circuit 92. The output of circuit 92 is connected to inputs of AND circuits 68, 69, 93 and 66. This output is also connected through a resistor 94 to the second input of AND circuit 78. A capacitor 95 is connected between the second input of AND circuit 78 and ground. The output of AND circuit 83 is connected through a resistor 96 to the second input of circuit 79. A capacitor 97 is connected between this input and ground. The output of circuit 69 and 70 are connected to inputs of respective AND circuits 98 and 99. The output of circuit 98 is connected to the second input of circuit 99, and the output of circuit 99 is connected to the second input of circuit 98. The output of circuit 98 is connected to the two inputs of an AND circuit 101. The output of circuit 101 is connected through a resistor 102 to terminal 87. The output of circuit 101 is also connected to the base of a transistor 103. The collector of transistor 103 is connected through relay coil 26 to terminal 89. A rectifier 104 is connected in parallel with relay coil 26. The emitter of transistor 103 is connected to ground through rectifier 105.

The output of AND circuit 93 is connected to inputs of AND circuits 67 and 108. The output of AND circuit 67 is connected to an input of an AND circuit 109, the output of which is connected to an input of an AND circuit 110. The output of AND circuit 110 is connected to the second input of circuit 109 and to the input of an AND circuit 111. The output of circuit 111 is connected to the input of an AND circuit 112. A capacitor 113 is connected between this input and ground. The output of circuit 110 is connected through a capacitor 114 to the second input of circuit 108. A resistor 115 is connected between this input and ground. The output of circuit 108 is connected to an input of an AND circuit 116. The output of circuit 116 is connected to the first input of an AND circuit 117, the second input of which is connected to the output of circuit 68. The output of circuit 117 is connected to the second inputs of circuits 108 and 116.

The output of AND circuit 110 is connected to the inputs of circuit 118. The output of circuit 118 is connected through a resistor 119 to terminal 87. The output of circuit 118 is also connected to the base of a transistor 120. The collector of transistor 120 is connected through relay coil 45 to terminal 89. A rectifier 121 is connected in parallel with relay coil 45. The emitter of transistor 120 is connected through a rectifier 122 to ground.

The output of AND circuit 116 is connected to the inputs of an AND circuit 123. The output of circuit 123 is connected through a resistor 124 to terminal 87. The output of circuit 123 is also connected to the base of a transistor 125. The collector of transistor 125 is connected by relay coil 40 to terminal 89. A rectifier 126 is connected in parallel with coil 40. The emitter of transistor 125 is connected through rectifier 122 to ground.

The illustrated logic circuit of FIG. 4 serves to energize relay coils 33, 45, 40 and 26 in the sequence illustrated in FIGS. 3b, 3c, 3d and 3e in response to output signals from switches 16, 17 and 18. This serves to control the described sequence of operation of the measuring circuit of FIG. 1. However, it should be evident that other configurations of logic circuits can be designed to perform the desired sequence of switching operations.

While this invention has been described in conjunction with a presently preferred embodiment, it should be apparent that it is not limited thereto.

What is claimed is:

1. Apparatus for measuring the indicated mean effective pressure of a four cycle internal combustion engine comprising:
- a pressure transducer adapted to be connected to the engine to establish a first signal representative of the pressure within a cylinder of the engine;
- a signal integrator comprising an operational amplifier having an input and an output, a feedback capacitor connected between the output and the input of said amplifier, and a switch connected in parallel with said capacitor;
- first control means adapted to be actuated by operation of the engine to close said switch at the end of a first time interval following the end of the expansion stroke of the engine cylinder and to open said switch at the beginning of the compression stroke of the engine cylinder;
- second control means adapted to be actuated by operation of the engine to apply said first signal to the input of said amplifier during the compression stroke of the engine cylinder;
- third control means adapted to be actuated by operation of the engine to reverse the polarity of said first signal and to apply same to the input of said amplifier during the expansion stroke of the engine cylinder so that the resulting signal stored on said capacitor at the end of the expansion stroke is the difference between the integrals of the cylinder pressure during compression and expansion;
- signal indicating means; and
- fourth control means adapted to be actuated by operation of the engine to connect the output of said amplifier to said indicating means within said time interval.

2. The apparatus of claim 1 wherein said second and third control means comprise:
- first switching means, a polarity reversing operational amplifier, and a second switching means connected in series between said pressure transducer and said integrator;
- circuit means connecting said first switching means directly to said second switching means; and
- means actuating said first and second switching means so that said pressure transducer is connected to said integrator through said operational amplifier when said switching means are in respective first positions and said pressure transducer is connected to said integrator through said circuit means when said switching means are in respective second positions.

3. The apparatus of claim 1 wherein the engine includes a flywheel and a cam shaft and wherein said first, second, third and fourth control means comprise:
- first and second signal generators positioned in spaced relationship with one another adjacent said flywheel;
- first and second signal generators mounted 180° apart on said flywheel so as to energize respective first and second generators once during each revolution of the flywheel;
- a third signal generator positioned adjacent said cam shaft;
- a third signal actuator mounted on said flywheel so as to energize said third generator once during each revolution of the flywheel; and
- means responsive to said first, second and third signal generators to establish control signals to carry out the operations of said control means.

4. The apparatus of claim 1 wherein said indicating means comprises:
- a signal storage means to receive the output of said amplifier; and
- a recorder connected to said signal storage means.

5. The apparatus of claim 4 wherein said signal storage means comprises a capacitor.

References Cited
UNITED STATES PATENTS
| | | | |
|---|---|---|---|
| 2,349,560 | 5/1944 | Reijnst | 73—115 |
| 3,389,599 | 6/1968 | Beale | 73—115 |

RICHARD C. QUEISSER, Primary Examiner

M. SMOLLAR, Assistant Examiner

U.S. Cl. X.R.

73—35, 116

UNITED STATES PATENT OFFICE
CERTIFICATE OF CORRECTION

Patent No. 3,625,054          Dated December 7, 1971

Inventor(s) Daniel M. Vesper et al.

It is certified that error appears in the above-identified patent and that said Letters Patent are hereby corrected as shown below:

Column 6, line 12, "generators" should read -- generator --; same line 12, before "mounted" insert -- actuators --.

Signed and sealed this 30th day of May 1972.

(SEAL)
Attest:

EDWARD M. FLETCHER, JR.           ROBERT GOTTSCHALK
Attesting Officer           Commissioner of Patents